Jan. 28, 1941.  E. G. MYERS  2,230,146
MIXING APPARATUS
Filed June 25, 1938  2 Sheets-Sheet 1
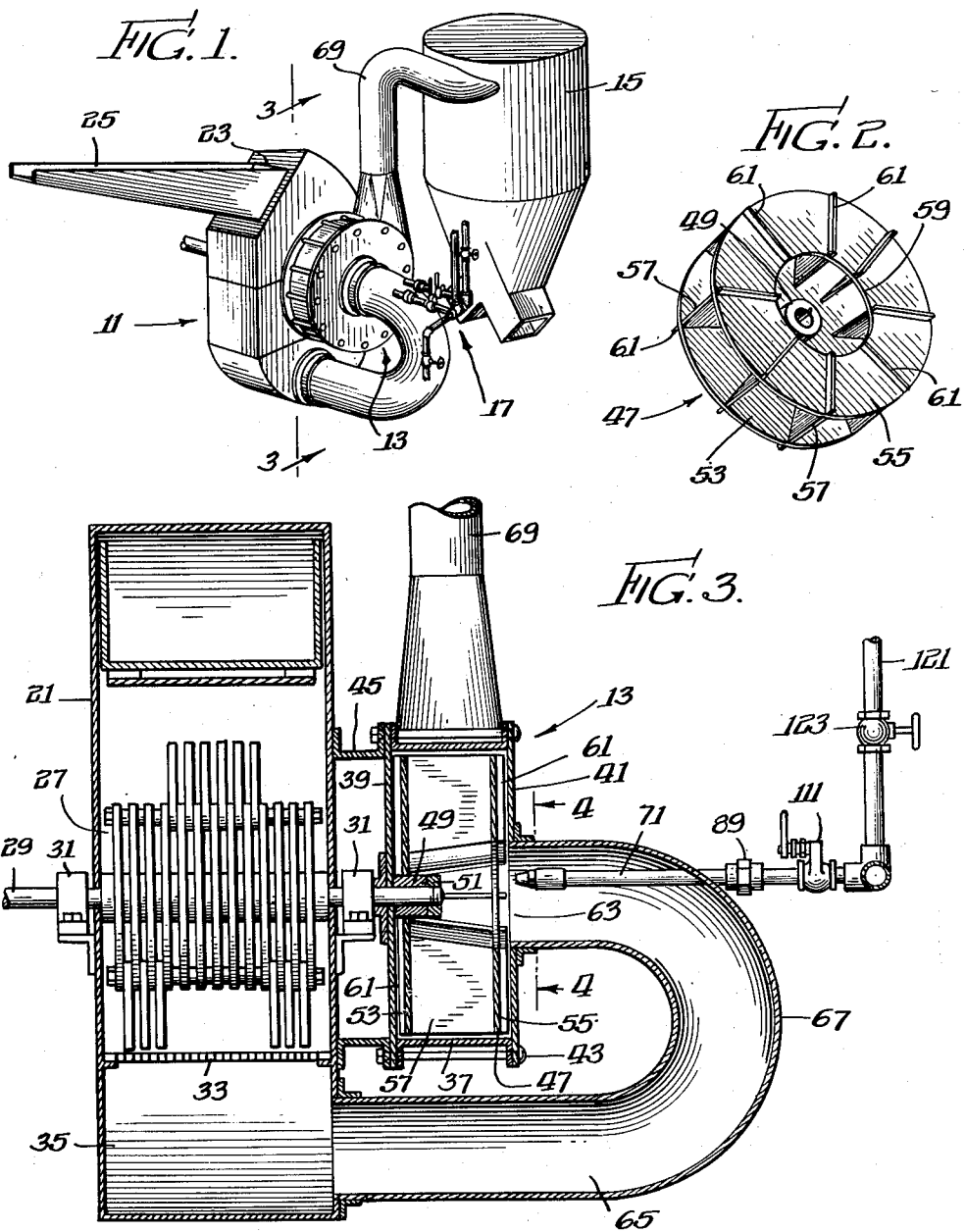

Jan. 28, 1941. E. G. MYERS 2,230,146
MIXING APPARATUS
Filed June 25, 1938 2 Sheets-Sheet 2
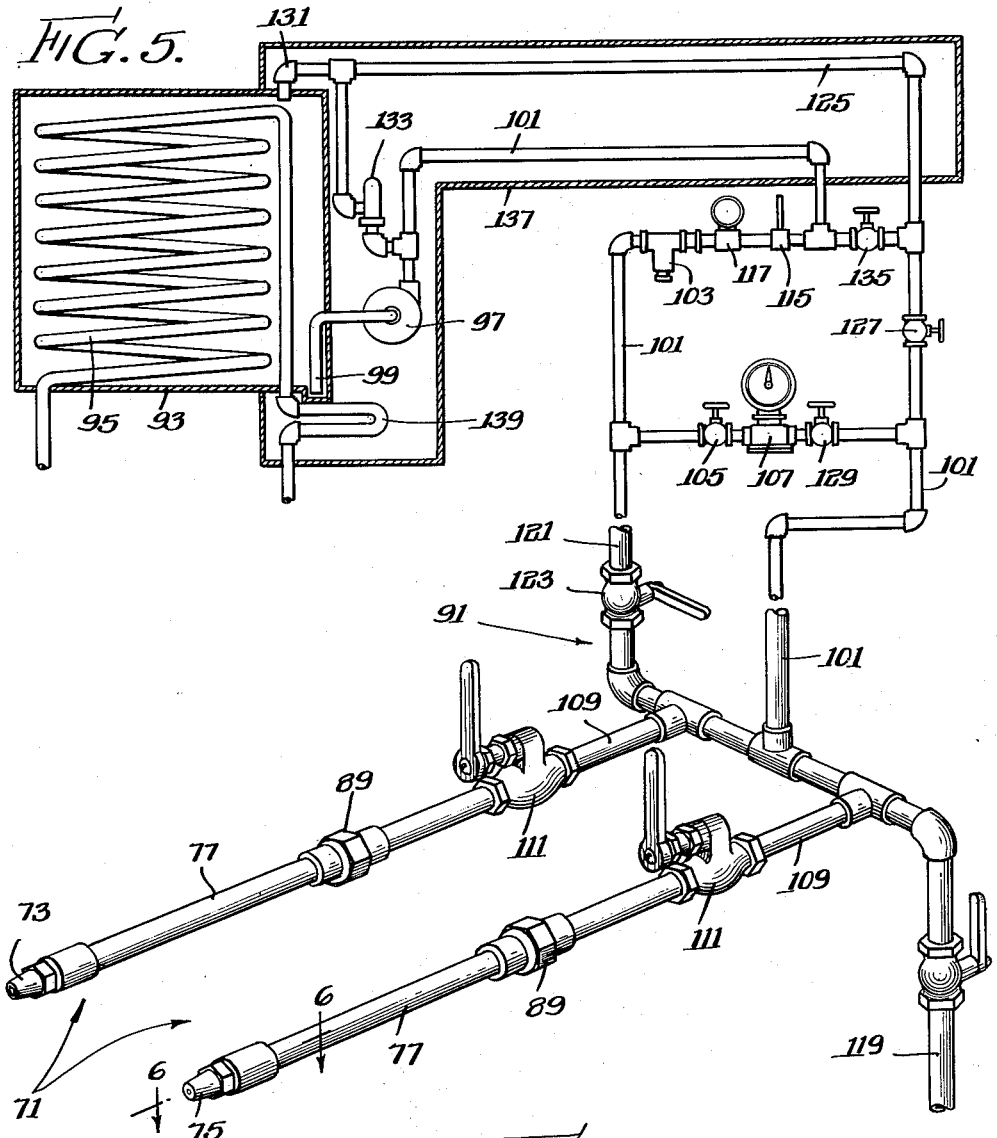
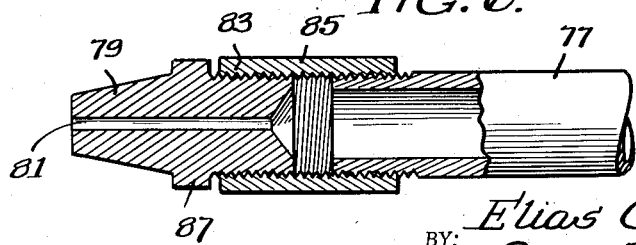
INVENTOR:
Elias G. Myers
BY: Cox & Moore
ATTORNEYS.

Patented Jan. 28, 1941

2,230,146

UNITED STATES PATENT OFFICE 2,230,146

MIXING APPARATUS

Elias G. Myers, Streator, Ill., assignor to The Myers-Sherman Company, Streator, Ill., a corporation of Ohio Application June 25, 1938, Serial No. 215,751

2 Claims. (Cl. 259—9)

My invention relates in general to mixing apparatus and has more particular reference to apparatus for mixing a liquid food ingredient with subdivided solid foodstuffs, the invention specifically contemplating the provision of equipment adapted for mixing molasses or similar liquid with subdivided edible materials, such as grain, hay, alfalfa, beans and similar vegetable matter such as may be used for animal feed.

An important object of the invention is to provide for mixing the liquid ingredient by injecting it under pressure into a stream of the subdivided solid material, preferably as delivered from a grinder; a further object being to apply the liquid to the subdivided solid material as the same is delivered through a blower or elevator for conveying the mixed feed to a receiver, the liquid, in accordance with my present invention, being applied substantially at a zone of maximum turbulence of the ground material as it enters the blower.

Another important object is to provide for accurately controlling the amount of liquid delivered for mixing with the ground material; a further object being to arrange the mechanism so that the flow of delivered liquid may be substantially increased to effect delivery of adequate quantities of the liquid when prevailing temperature conditions are such that the liquid is slow flowing, as, for example, when the apparatus is started in operation at low temperature.

Another important object is to provide apparatus of the character described, embodying a plurality of liquid delivery nozzles, at least one of which has an orifice of size unlike that of another of the nozzles in order to permit accurate adjustment of the total rate of flow of delivered liquid.

Another important object is to utilize a plurality of nozzles in conjunction with a fan or blower to apply liquid to subdivided solid material passing through the blower whereby to impregnate the solid material with the liquid.

Another important object is to provide a self-cleaning blower of improved construction for use in conjunction with a liquid spray nozzle arranged to spray the liquid directly into the blower for the purpose of impregnating subdivided solid material passing therethrough as a result of the operation of the blower.

Numerous other objects, advantages and inherent functions of the invention will become apparent as the same is more fully understood from the following description, which, taken in connection with the accompanying drawings, discloses a preferred embodiment of the invention.

Referring to the drawings:

Figure 1 is a perspective view of the mixing apparatus embodying my present invention;

Figure 2 is a perspective view of the rotor of a blower forming a part of the apparatus illustrated in Figure 1;

Figure 3 is a sectional view taken substantially along the line 3—3 in Figure 1;

Figure 4 is a sectional view taken substantially along the line 4—4 in Figure 3;

Figure 5 is a diagrammatic view of the liquid delivery equipment embodied in the apparatus shown in Figure 1; and Figure 6 is a sectional view taken substantially along the line 6—6 in Figure 5.

To illustrate my invention, I have shown, on the drawings, a mixing device comprising a grinding mill 11 adapted to receive solid feed material and subdivide the same, a blower 13 adapted to draw the subdivided feed material continuously from the grinding mill, and deliver the same as a stream into a receiver 15, and liquid applying means 17 for impregnating the feed material with a desired liquid as it is conveyed from the grinding mill to the receiver.

The grinding mill 11 may, of course, take any suitable or convenient form, but I prefer to utilize a device comprising a preferably sheet-metal casing 21 having an inlet opening 23 in the upper portions of the casing, a convenient loading chute 25 being provided to facilitate delivery of material into the opening for grinding.

The casing 21 encloses suitable grinding means comprising, in the illustrated embodiment, a rotary beater mechanism 27 carried on an axle shaft 29 suitably journalled in bearings 31 supported on the opposed walls of the casing 21. The casing 21 also preferably contains a screen 33 within the casing and disposed beneath the rotary beating mechanism so that, upon rotation of the mechanism 27, material introduced into the casing will be subdivided by the operation of the mechanism 27 above the screen 33, and when reduced to a desired granular size may penetrate the screen and be delivered to a compartment 35 located in the casing 21 below the screen 33.

The blower 13 preferably comprises a casing having a cylindrical wall 37 and a pair of end walls 39 and 41. These walls are secured together in any suitable or convenient fashion and preferably by means of bolts 43 arranged circularly in the casing and serving to hold the cylindrical and end walls together and upon a mounting bracket 45 by means of which the casing of the blower is secured upon the casing 21 preferably in coaxial alignment with the axle shaft 29 of the grinding mechanism.

Within the blower casing is a rotor 47, the details of which are illustrated in Figure 2 of the drawings. This rotor comprises a central hub 49 adapted to be secured in any suitable or convenient fashion, as by means of the nut 51, upon the end of the axle shaft 29, so that the blower and the grinding mill may both be operated from a common source of power drivingly connected with the axle shaft 29.

The rotor 47 comprises a circular plate forming an end wall 53 which is secured on and extends outwardly of the hub 49, and a second plate 55 secured on and in spaced relationship with respect to the plate 53 by means of radially extending vanes or blades 57 positioned between the plates 53 and 55 and secured thereto in any suitable or convenient manner, preferably by welding the opposite side edges of the blades 57 upon plates 53 and 55.

The plate 55 has an enlarged central opening 59 concentric with the axis of the hub 49, and the outwardly facing surfaces of the plates 53 and 55 are provided with radially extending, outstanding fins 61, the fins preferably extending opposite and parallel with the blades 57, and may be secured in place on the plates 53 and 55 by welding or in any other suitable fashion.

The rotor is constructed to fit snugly within the blower housing, with the outermost edges of the fins 61 barely clearing the inner faces of the housing walls 39 and 41. The rotor plate 55 extends parallel and adjacent with the housing wall 41, with the opening 59 of the plate 55 in registration with a centrally-disposed opening 63 formed in the housing wall 41. This wall opening 63 forms an inlet to the blower and is preferably connected with the compartment 35 of the grinding mill by means of a pipe or conduit 65 preferably circularly bent, as at 67. Subdivided material may be drawn from the chamber 35 through the conduit 65 and delivered into the blower and through the rotor opening 59 substantially centrally of the rotor when the blower is in operation. Thence the subdivided material is ejected radially through the rotor and passes through an outlet opening in the cylindrical wall 37 of the blower casing to and through a conduit 69 leading to the receiver 15. The subdivided material thus flows in a continuous stream from the chamber 35 through the blower and into the receiver.

The area of maximum turbulence in this path of flow is the zone within the rotor at the central portions thereof, and I provide means for impregnating the subdivided solid material with a liquid, such as molasses, as the material passes through this zone of maximum turbulence. To this end I provide spray means 71 extending in the conduit 67 and including nozzles disposed in the opening 63 in position to spray the liquid directly into the central portions of the rotor, as shown clearly in Figure 3. The nozzles are preferably two in number, there being a nozzle 73 having a relatively large spray opening, and a nozzle 75 having a smaller opening.

The nozzles are disposed preferably on opposite sides of a vertical plane through the axis of the blower and lie preferably in a horizontal plane extending slightly above the axis of the rotor. The nozzles are preferably mounted on and supported by pipes 77 which extend into the conduit 65 near the blower-connected end thereof through suitable openings in which the pipes are preferably sealed in any suitable fashion, as by brazing.

The nozzles 73 and 75 each preferably comprise a nozzle element 79 comprising a generally cylindrical metal element having an axial channel 81, the nozzle being preferably threaded at one end, as at 83, for connection in a coupling 85 by means of which the nozzle element is mounted on its supporting pipe 77. The nozzle elements may each be formed with a nut portion 87 to facilitate attachment thereof in the coupling 85.

Outwardly of the conduit 65 the ends of the pipes 77 are preferably fitted with readily detachable coupling means 89 to facilitate connection thereof with a liquid supply system 91, the details of which are clearly illustrated in Figure 5 of the drawings. This liquid delivery system preferably comprises a liquid reservoir or storage tank 93 for the molasses or other liquid to be delivered through the nozzles and into the blower for mixing with the subdivided material passing therethrough.

Since molasses is a relatively viscous liquid, especially when cold, I prefer to provide means for maintaining the temperature of the stored molasses in the reservoir 93 at or above a temperature at which the liquid flows freely. To this end I provide a warming coil 95 within the reservoir, said coil comprising preferably a pipe connected to receive a heating medium from any suitable source.

The apparatus of my present invention is particularly adapted for mounting as a mobile unit on an automotive vehicle, in which case the heating coil 95 may be interconnected with the cooling water circulating system of the vehicle engine. In such an arrangement, the engine cooling medium absorbs heat from the engine and may be delivered to the coil 95 preferably at the bottom end thereof, and passing upwardly through the coil may serve to maintain the molasses at a temperature at which the same flows freely.

Means is provided for delivering molasses from the reservoir 93 to the nozzles 73 and 75 under pressure in order that the liquid may be delivered into the blower as a continuous stream at uniform pressure. To this end I provide a pump 97 having an intake 99 disposed in the bottom of the reservoir 93, which may be provided with a pocket or sump into which the intake 99 extends, in order that all of the molasses may be drawn from the tank through the pump, if necessary.

The pump 97 discharges to a conduit 101 which leads through a strainer 103, a valve 105, and a meter 107 to the nozzles, the conduit 101 having branches 109 connected with each of the nozzles, each branch being provided with a nozzle controlling valve 111 of any convenient construction, and preferably of the so-called quick-acting type.

A thermometer or other suitable temperature indicating device 115 and a pressure gauge 117 may be arranged in the conduit 101 preferably in advance of the strainer 75 to register the temperature and pressure of the liquid in the delivery system.

The system is also provided with a valved drain outlet 119 which communicates with the main delivery conduit 101 preferably at the lowest point of the liquid delivery system.

A bypass conduit 121, controlled by a valve 123, and a return conduit 125 controlled by a valve 127, are also provided to permit the liquid to be circulated through the system without passing through the meter 107 and without discharging through the nozzles when the liquid is cold, since it is desirable to circulate viscous liquids for an interval through the system before starting the mixing operation, in order to insure proper mixing fluidity which may be determined at the drain outlet 119.

Bypass circulation may be accomplished by closing the valves 105 and 111 and opening the valves 123 and 127. A valve 129 is also provided on the discharge side of the meter 107 to prevent back pressure from affecting the same when the liquid is bypassed, as aforesaid. The return conduit 125, which is controlled by the valve 127, is also connected between the delivery conduits 101 on the discharge side of the meter, and discharges, as at 131, into the upper portion of the reservoir 93. A spring-actuated relief valve 133 also may be and preferably is connected between the conduits 101 and 125 on the discharge side of the pump 97 to maintain the molasses or other fluid in the delivery line 101 below a predetermined safe operating maximum pressure.

When the system is in normal operation, with the valves 105, 129, and one or both of the valves 111, open, and the valve 123 closed, the valve 127 may be opened to any desired degree in order to regulate the pressure of the liquid at the nozzles, and to return to the reservoir excess liquid not needed to maintain the desired nozzle pressure. A valve 135 also is preferably interposed directly between the return pipe 125 and the delivery pipe 101, in advance of the thermometer 115 and the pressure gauge 117, in order to provide for the further regulation of pressure in the system.

In order to aid in maintaining the liquid in a substantially fluid condition in the pump and in the delivery and return pipes 101 and 125, I prefer to enclose the pump and relief valve 133, and as much of the conduits 101 and 125 as is feasible, in a heat-conserving housing 137 which at its lower end encloses a heating coil 139 which may form a part of the liquid heating system, the coil 139 preferably being connected pipe from the liquid-heating coil 95. Even after the heating medium has passed out of the coil 95, it will contain considerable heat, which may be delivered by the coil 139 into the housing 137 in order to maintain the enclosed parts in substantially warm condition.

The pump 97 has a capacity sufficient to deliver liquid into the conduit 101 at a pressure somewhat higher than that at which the relief valve 133 is set to operate. The relief valve, however, insures that a predetermined maximum safe pressure is not exceeded in the conduit 101. The liquid is delivered under pressure through the pipe 101, the strainer 103 and the meter 107, to the nozzles, the valves 105 and 129 being open and the valves 123, 119 being closed. By manipulating the valves 127 and 135, a part of the liquid discharged from the meter may be returned back to the reservoir through the pipe 125 to regulate the amount of liquid delivered at the nozzles.

By making one of the nozzles, such as the nozzle 73, of larger flow capacity than the other, I am able to provide great flexibility in regulating the amount of liquid delivered into the blower through the nozzles. This is of advantage since by operating the valves 111, the flow rate of molasses or other liquid delivered through the nozzles may be regulated with precision to accommodate for variations in viscosity of the fluid within the normal expected temperature range, or due to other causes such as the use of different kinds of impregnating media. It may also be necessary to regulate the rate of liquid delivery to provide light or heavy impregnation of the subdivided material.

When the impregnant liquid is viscous, as when cold, it may be necessary to apply the liquid at maximum pressure through both nozzles. As the liquid becomes less sluggish, the nozzle 73 may be throttled to reduce flow therethrough. If still greater flow reduction is desired, the nozzle 73 may be completely closed off and the nozzle 75 throttled. Finally, the pressure may be reduced to any degree by means of the bypass valve 127. It will be seen, therefore, that the foregoing arrangement, including the duplex nozzles, affords extremely precise flow control of fluid delivered through the nozzles.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. Mixing apparatus comprising a blower having a rotor turnable on an axis, and an inlet opening in concentric relationship with respect to the axis of the rotor, means forming a conduit connected to said opening for delivering subdivided material into said blower through said opening, and spray means comprising a pair of pipes extending through a defining wall of said conduit and having each a nozzle within the conduit and disposed in said opening in position to spray a fluid into the blower directly upon said rotor whereby to mix the fluid with subdivided material delivered into the blower through said conduit, the axes of said nozzles being parallel and lying in a plane which does not include the axis of the rotor, said pipes each having means including a coupling thereon outwardly of said conduit for connecting the pipes with a source of fluid under pressure, and a valve associated with each pipe for regulating fluid flow therethrough to the nozzle mounted thereon, one of said nozzles having a larger flow capacity than the other whereby to permit a wide range of flow control of fluid delivered therethrough.

2. Mixing apparatus comprising a blower having a rotor turnable on an axis within a casing providing an inlet opening in line with said axis and through which opening subdivided material may be delivered to the blower, and a plurality of nozzles, at least one of which is of larger flow caapcity than another, disposed in said opening in position to deliver, directly into said blower toward the axis of said rotor, a fluid medium to be mixed with the subdivided material, and valve means for controlling each nozzle individually whereby to obtain precise regulation of the rate of flow of medium sprayed therethrough.

ELIAS G. MYERS.